Feb. 26, 1924.
D. M. TILLER
1,485,095
PORTABLE MEASURING DEVICE
Filed March 9, 1921    2 Sheets-Sheet 2
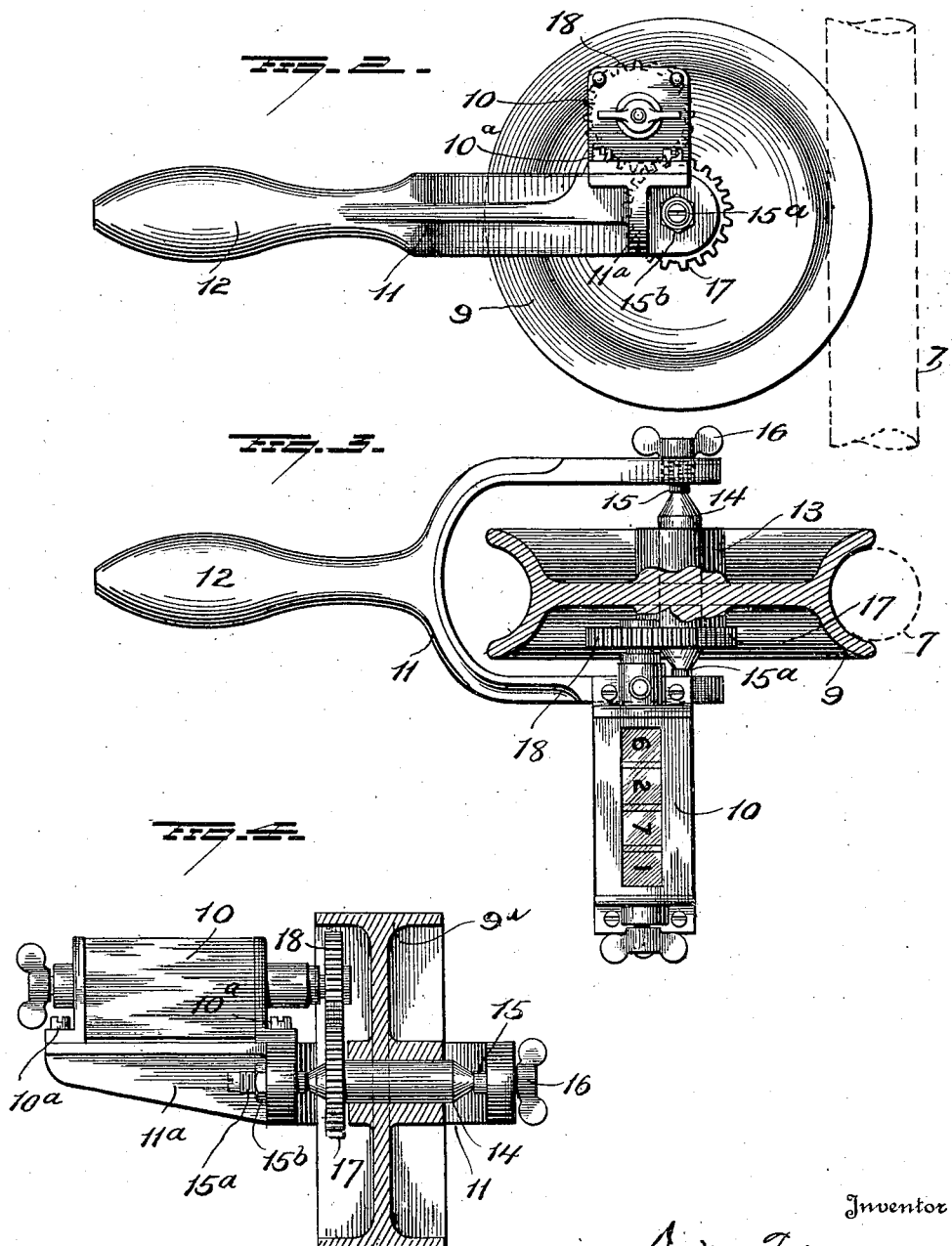
Inventor
D. M. Tiller
By Seymour & Bright
Attorney Patented Feb. 26, 1924.

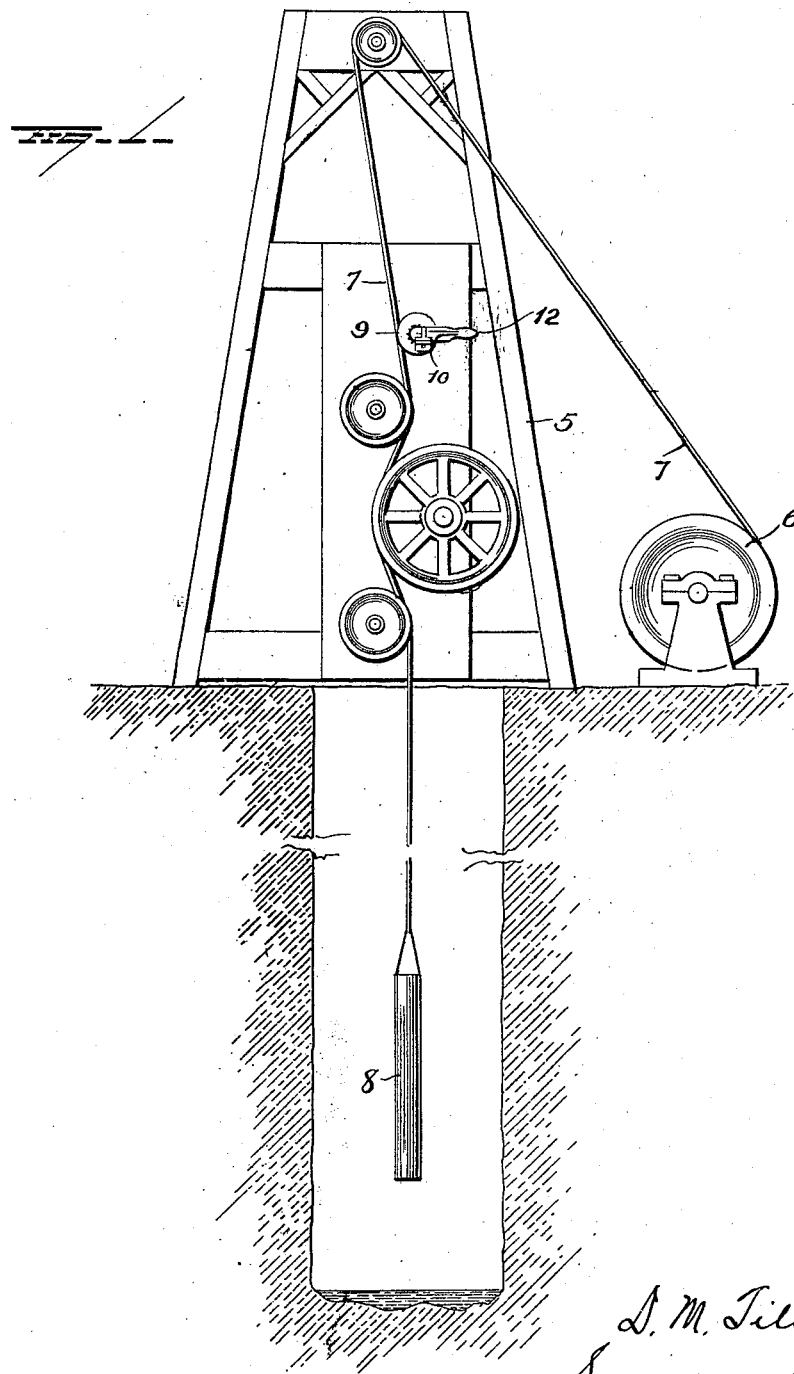

1,485,095

UNITED STATES PATENT OFFICE.

DAVID M. TILLER, OF BROKEN ARROW, OKLAHOMA, ASSIGNOR TO THE TILLER MANUFACTURING COMPANY, OF KANSAS CITY, MISSOURI.

PORTABLE MEASURING DEVICE.

Application filed March 9, 1921. Serial No. 450,947.

*To all whom it may concern:*

Be it known that I, DAVID M. TILLER, a citizen of the United States, and a resident of Broken Arrow, in the county of Tulsa and State of Oklahoma, have invented certain new and useful Improvements in Portable Measuring Devices; and I do hereby declare the following to be a full, clear, and exact description of the invention, such as will enable others skilled in the art to which it appertains to make and use the same.

My invention relates to an improvement in portable measuring devices designed more particularly for measuring the depth of oil wells at any stage during the process of drilling, the object being to provide a device that can be readily handled and applied to the drill cable while the latter is being lowered into or withdrawn from a well, and accurately register the length of cable and consequently the depth of the hole drilled at any stage in the drilling.

A further object is to provide a device which shall be simple in construction; efficient and reliable in operation, and which can be readily and conveniently operated by one assistant.

With these ends in view my invention consists in the details of construction as will be more fully explained and pointed out in the claims.

In the accompanying drawings, Figure 1 is a diagrammatic view showing the method of applying my improvement to a cable carrying a weight such as a drill; Figure 2 is a view in side elevation of the measuring and recording device; Figure 3 is a view in plan the friction wheel being in section, and Figure 4 is a view partly in elevation.

In the drawing I have illustrated diagrammatically a derrick 5, a hoist drum 6 and a cable 7, to which a drill, or bailer or other weight 8 is attached, but I would have it understood that my improvement is not dependent in the slightest upon the construction of apparatus employed for hoisting or lowering the cable or its equivalent, and that it is equally applicable for measuring flat surfaces such as belting, etc.

My improved measuring device comprises a wheel 9, a registering device or counter 10 and a frame 11 having a handle 12 by which it is held by the operator. The frame is U-shape as shown with the handle 12 projecting centrally therefrom, and one of its side members is provided with an integral bracket 11ª on which the register or counter 10 is seated and to which it is secured by the screws 10ª.

The wheel 9 is mounted within the U-shaped frame and when used for measuring the depth of a well, is provided with a peripheral groove so that it may be held firmly against the cable 7 as shown in Figure 1, and is preferably a foot in circumference at its centre, so that each foot of cable will revolve the wheel once. This wheel is provided with a hub 13, preferably terminating as at 14, in conical pivots which are mounted in bearings 15 and 15ª carried by the frame 11, the bearing 15 being screwed into the frame 11 and provided at its outer end with the wings 16 by which it may be turned to release and permit of the ready removal of wheel 9, and also by which it may be adjusted to bear with sufficient friction against the conical pivot to prevent any free rotary movement of the wheel, except of course when the wheel is in contact with a cable, or other object to be measured. The other bearing 15ª is also preferably made adjustable as shown in Figure 4 but after it has been initially adjusted it is locked by the nut 15ᵇ.

The hub 13 of wheel 9 is provided with a pinion 17 which meshes with a pinion 18 connected up with the disks on registering mechanism 10 which may be of any approved construction. The frame of this registering mechanism 10 is secured to the side member of the U-shaped frame 11 adjacent pinion 17, so that when the parts are assembled every revolution of the wheel will be registered and indicate the length of rope that has been lowered, and also indicate the exact depth of rope in the well when the weight 8 reaches the bottom, the gears of course being so proportioned that one revolution of the wheel registers one unit on the register.

In the operation of the device for measuring the depth of an oil well or drilling, the operator grasps the handle 12 of the frame 11 and holds the wheel 9 in contact with the cable as shown in Figure 1. By now lowering the cable in the usual way, the contact of the cable with the wheel rotates the latter and registers on the counter 10 the number of feet that have passed in contact with the wheel thus indicating exactly, or within a fraction of a foot, the depth of the well. If the drill or other tool should be at the bottom and it is necessary or desirable to ascertain the depth, the measuring device would simply be reversed, that is, turned upside down, and the upward movement of the cable would turn the wheel 9 in the direction to properly register the length of cable or rope and consequently the depth of the well.

The device can be applied to the cable while raising or lowering a drill, bailer, or any other tool employed in drilling wells, consequently the depth of the well can be ascertained at any time and without the loss of any time, it simply being necessary to hold the wheel 9 in contact with the cable, with sufficient pressure to cause the wheel to rotate.

When the apparatus is used for measuring well casing being lowered into a well, or when used for measuring flat surfaces such as belting, boards, rubber strips etc., a flat wheel 9ª shown in Figure 4 is substituted for the grooved wheel.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. A portable registering device comprising a frame having two side members, longitudinally adjustable bearings carried by said side members, a wheel the hub of which is carried by said adjustable bearings and a registering device carried by the frame and geared to said wheel.

2. A portable measuring device comprising a frame having side members and a handle, a wheel the axle of which is mounted in side bearings one of said bearings being adjustable in the direction of the axis of the axle, a registering device rigidly fixed to said frame, and means connecting the wheel and registering device.

3. A portable registering device comprising a frame having two side members and a handle, a wheel having a hub, bearings carried by said side members and adjustable in the direction of the axis of the hub of said wheel, means for locking one of said adjustable bearings after it has been adjusted, the other adjustable bearing being free to be moved longitudinally in the direction of the axis of the hub whereby friction on said wheel can be regulated, and a registering device carried by one side member of the frame and geared up to said wheel.

In testimony whereof, I have signed this specification in the presence of two subscribing witnesses.

DAVID M. TILLER.

Witnesses:
G. F. DOWNING,
S. G. NOTTINGHAM.